(12) United States Patent
Wright et al.

(10) Patent No.: US 9,308,879 B2
(45) Date of Patent: Apr. 12, 2016

(54) METHOD, SYSTEM, AND APPARATUS OF VEHICLE AND FLEET OPERATOR PROFILE AUTOMATION AND DEPLOYMENT

(75) Inventors: George L. Wright, Corrales, NM (US); Mark A. Wright, Albuquerque, NM (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 2193 days.

(21) Appl. No.: 12/186,885

(22) Filed: Aug. 6, 2008

(65) Prior Publication Data

US 2010/0036560 A1 Feb. 11, 2010

(51) Int. Cl.
*G06F 7/00* (2006.01)
*B60R 16/037* (2006.01)

(52) U.S. Cl.
CPC .................................. *B60R 16/037* (2013.01)

(58) Field of Classification Search
USPC .......................................................... 701/36
See application file for complete search history.

(56) References Cited

U.S. PATENT DOCUMENTS

| | | | |
|---|---|---|---|
| 5,451,964 A | 9/1995 | Babu |
| 5,719,764 A | 2/1998 | McClary |
| 5,906,655 A | 5/1999 | Fan |
| 5,969,668 A | 10/1999 | Young, Jr. |
| 6,018,698 A | 1/2000 | Nicosia et al. |
| 6,167,347 A | 12/2000 | Lin |
| 6,240,367 B1 | 5/2001 | Lin |
| 6,266,582 B1 | 7/2001 | Bruckner |
| 6,298,316 B1 | 10/2001 | Diesel |
| 6,408,245 B1 | 6/2002 | An et al. |
| 6,430,488 B1 | 8/2002 | Goldman et al. |
| 6,449,559 B2 | 9/2002 | Lin |
| 6,611,842 B1 | 8/2003 | Brown |
| 6,654,685 B2 | 11/2003 | McIntyre |

(Continued)

FOREIGN PATENT DOCUMENTS

| | | |
|---|---|---|
| DE | 10 2005 018 078 A1 | 10/2006 |
| DE | 10 2007 012 373 A1 | 9/2007 |

(Continued)

OTHER PUBLICATIONS

European Search Report from corresponding EP Application No. 09167212.1, mailed Oct. 16, 2009, 3 pages.

(Continued)

*Primary Examiner* — Imran Mustafa
(74) *Attorney, Agent, or Firm* — Ingrassia Fisher & Lorenz, P.C.

(57) ABSTRACT

A method, system, and device are presented for customizing vehicles for drivers using a vehicle-operator profile. The vehicle-operator profile contains adjustable-vehicle-related parameters related to one or more adjustable devices, such as power seats, power mirrors and entertainment devices, in a vehicle. The adjustable-vehicle-related parameters may be determined by data entry, by simulation of the vehicle, and/or by data processing, including processing ergonomic data for the driver. The adjustable-vehicle-related parameters may be stored on a profile-storage device and may be downloaded to the adjustable devices via a vehicle-setting-storage device. The adjustable devices may change based on the adjustable-vehicle-related parameters. If the adjustable devices are adjusted, the adjustable-vehicle-related parameters in the vehicle-operator profile may be updated to reflect the adjustments to the adjustable devices.

15 Claims, 8 Drawing Sheets

(56) References Cited

U.S. PATENT DOCUMENTS

| | | |
|---|---|---|
| 6,665,600 B2 | 12/2003 | Miller et al. |
| 6,759,943 B2 | 7/2004 | Lucy et al. |
| 6,957,207 B2 | 10/2005 | Sasaki |
| 6,982,669 B2 | 1/2006 | Coatantiec et al. |
| 7,177,738 B2 | 2/2007 | Diaz |
| 7,203,486 B2 | 4/2007 | Patel |
| 7,219,013 B1 | 5/2007 | Young et al. |
| 7,283,902 B2 | 10/2007 | Heider et al. |
| 2,285,900 A1 | 1/2008 | Wright et al. |
| 7,328,104 B2 | 2/2008 | Overstreet et al. |
| 7,409,289 B2 | 8/2008 | Coatantiec et al. |
| 7,447,590 B2 | 11/2008 | Arethens |
| 7,551,980 B2 | 6/2009 | Sakagami et al. |
| 8,065,074 B1 | 11/2011 | Liccardo |
| 8,290,744 B2 | 10/2012 | Brady et al. |
| 2001/0020216 A1 | 9/2001 | Lin |
| 2002/0019701 A1 | 2/2002 | Miller |
| 2002/0073088 A1 | 6/2002 | Beckmann et al. |
| 2003/0023463 A1 | 1/2003 | Dombroski et al. |
| 2003/0080850 A1 | 5/2003 | Kline |
| 2003/0135327 A1 | 7/2003 | Levine et al. |
| 2003/0149600 A1 | 8/2003 | Williams |
| 2004/0010358 A1* | 1/2004 | Oesterling .......... B60R 16/0231 701/49 |
| 2004/0268217 A1 | 12/2004 | Hughes et al. |
| 2005/0125141 A1 | 6/2005 | Bye |
| 2005/0144048 A1 | 6/2005 | Belanger et al. |
| 2005/0261815 A1 | 11/2005 | Cowelchuk et al. |
| 2006/0038447 A1* | 2/2006 | Bruelle-Drews ..... B60N 2/0244 307/10.1 |
| 2006/0123081 A1 | 6/2006 | Baudino et al. |
| 2007/0219675 A1 | 9/2007 | Uchida et al. |
| 2007/0239494 A1 | 10/2007 | Stephens et al. |
| 2007/0294116 A1 | 12/2007 | Stephens et al. |
| 2008/0151793 A1 | 6/2008 | Wright |
| 2008/0151841 A1 | 6/2008 | Yi et al. |
| 2008/0151889 A1 | 6/2008 | Yi et al. |
| 2009/0216935 A1 | 8/2009 | Flick |
| 2009/0254278 A1 | 10/2009 | Wang |
| 2009/0326816 A1 | 12/2009 | Park et al. |
| 2010/0228408 A1 | 9/2010 | Ford et al. |
| 2011/0117903 A1 | 5/2011 | Bradley |
| 2011/0304507 A1 | 12/2011 | Mujahed et al. |

FOREIGN PATENT DOCUMENTS

| | | |
|---|---|---|
| EP | 1837627 A2 | 9/2007 |
| EP | 1837627 A3 | 11/2007 |
| JP | 62128850 A | 6/1987 |
| JP | 2005246997 A | 9/2005 |
| JP | 2007-062400 | 3/2007 |
| WO | WO 2004/074047 A1 | 9/2004 |
| WO | 2005069131 A1 | 7/2005 |

OTHER PUBLICATIONS

European Office Action from corresponding EP Application No. 09167212.1, mailed Nov. 6, 2009, 4 pages.
Robert Boys, Diagnostics and Prognostics for Military and Heavy Vehicles, 2004, pp. 1-13, Version 1.81, Dearborn Group, Inc.
EP Communication for EP 09167212.1-1264 dated Nov. 30, 2012.
JP Office Action for Application No. 2009-182723 dated May 7, 2014.
JP Office Action for Application No. JP 2009-182723 dated Jan. 8, 2014.
CN Office Action for Application No. 201110050581.6 dated Jan. 12, 2015.
EP search report, EP 11155074.5-1557/2378248, dated Mar. 24, 2014.
USPTO Office Action for application No. 13/029,204 dated Mar. 26, 2013.
USPTO Office Action for Application No. 13/029,204 dated Apr. 16, 2015.
EP Exam Report for application No. 11155074.5 dated Apr. 25, 2014.
EP Communication, EP 09167212.1-1264 dated Apr. 20, 2011.
USPTO Office Action for Application No. 13/029,204 dated Aug. 30, 2013.
EP Communication for Application No. 11155074.5-1557, dated Aug. 21, 2015.
CN Office Action for Application No. 201110050581.6 dated Sep. 15, 2015.
USPTO Office Action, Notification Date Sep. 29, 2015; U.S. Appl. No. 13/029,204.
EP Examination Report for Application No. 09167212.1 dated Oct. 7, 2014.
USPTO Office Action, Notification Date Oct. 3, 2014; U.S. Appl. No. 13/029,204.
JP Office Action for Application No. JP 2009-182723 dated Sep. 10, 2013.
JP Office Action for Application No. 2009-182723 dated Oct. 2, 2014.

* cited by examiner

600 Vehicle-Operator Profile
    610 Driver Information
        612 Driver Name
        614 Financial Information
        616 Training/Qualification Information
        618 Driver Identification
        620 Driver Ergonomic Data
            622 Driver Height
            624 Driver Weight
            626 Driver Limb Lengths
            628 Driver Health Conditions
            629 Other Ergonomic Data
    630 Adjustable-Vehicle-Related Parameters
        632 Make/Model Information
        634 Seat Positions
        636 Mirror Positions
        638 Steering-Wheel Position
        640 Entertainment Settings
        642 Climate-Control Settings
        644 Safety Settings
        646 Other Parameters
    650 Route Information
        652 Starting Location
        654 Starting Time
        656 Destination
        658 Intermediate Points
        660 Timing Information
    670 Communication Information
        672 E-mail Address
        674 Connection Information
        676 Phone Number
        678 Subscription Information
    680 Vehicle-Selection Information
        682 Favorite Vehicles
        684 Unacceptable Vehicles
    690 Passenger Information

Figure 6

METHOD, SYSTEM, AND APPARATUS OF VEHICLE AND FLEET OPERATOR PROFILE AUTOMATION AND DEPLOYMENT

BACKGROUND OF THE INVENTION

1. Field of the Invention

This invention relates to the field of computerized vehicle customization. More particularly, this invention relates to a method and apparatus for managing vehicle operator profiles.

2. Background

Modern vehicles contain many devices that are adjustable on a user-by-user basis. In particular, many modern vehicles have several adjustable devices such as mirrors, steering wheels, and seats. A driver and/or passengers of the vehicle may adjust these devices for their safety and comfort. For example, the driver of a vehicle may adjust rear-view, driver-side and passenger-side mirrors to readily view nearby vehicles while driving. Seats are adjustable to permit the driver and any passengers to sit comfortably. Persons in the vehicle may adjust other devices in the vehicle as well, such as entertainment devices and safety devices.

Many vehicles have two or more drivers for the same vehicle. For example, hundreds of people may rent and drive a given rental car during its lifespan. Vehicle fleet operators, such as trucking companies, limousine services, and the military, may have a large number of vehicles that are each driven by a wide number of drivers. Several drivers may drive a single privately owned vehicle as well, such as two spouses sharing a vehicle.

SUMMARY

A first embodiment of the invention provides a method of communicating adjustable-vehicle-related parameters. A vehicle-operator profile is determined using a profile-entry device at a first location. A plurality of adjustable-vehicle-related parameters relating to a vehicle is determined. The plurality of adjustable-vehicle-related parameters is based on the vehicle-operator profile. The plurality of adjustable-vehicle-related parameters is communicated to a vehicle-setting-storage device. The vehicle-setting-storage device is located in or near the vehicle at a second location. The second location differs from the first location.

A second embodiment of the invention provides a device. The device includes a processor, data storage, and machine language instructions. The machine language instructions are stored in the data storage and are executable by the processor to perform functions, including: (i) determining a vehicle-operator profile for a driver, (ii) determining a plurality of adjustable-vehicle-related parameters for a remote vehicle based on the vehicle-operator profile, and (iii) transmitting the plurality of adjustable-vehicle-related parameters to the remote vehicle.

A third embodiment of the invention provides a system. The system includes a vehicle and a profile-storage device. The vehicle includes a vehicle-setting-storage device and an adjustable device. The vehicle-setting-storage device is configured to receive a selected plurality of adjustable-vehicle-related parameters. The adjustable device is configured to be adjusted based on one or more adjustable-vehicle-related parameters in the received plurality of adjustable-vehicle-related parameters. The profile-storage device is configured to select a vehicle-operator profile from one or more vehicle-operator profiles. Each vehicle-operator profile includes one or more adjustable-vehicle-related parameters. The profile-storage device is also configured to transmit a selected plurality of adjustable-vehicle-related parameters from the selected vehicle-operator profile to the vehicle.

BRIEF DESCRIPTION OF THE DRAWINGS

Various examples of embodiments are described herein with reference to the following drawings, wherein like numerals denote like entities, in which:

FIG. 6 is a schematic diagram of an example vehicle-operator profile, in accordance with embodiments of the invention;

DETAILED DESCRIPTION

Figure 1:
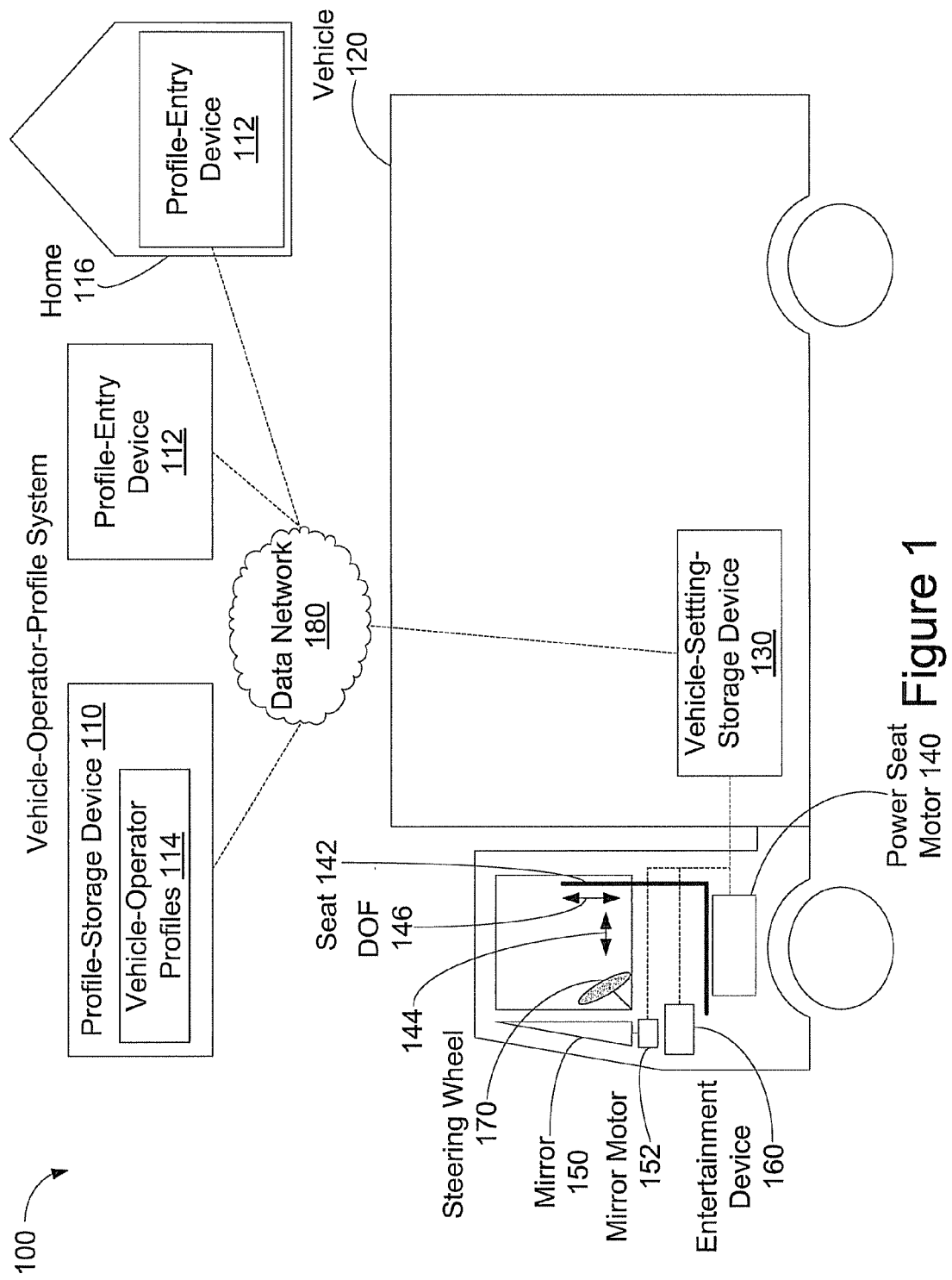
FIG. 1 shows an example vehicle-operator-profile system with a profile-storage device, a profile-entry device, and a vehicle containing a vehicle-setting storage device, in accordance with embodiments of the invention.

To customize a vehicle for a driver, one or more adjustable-vehicle-related parameters are stored with a vehicle-operator profile for the driver. The adjustable-vehicle-related parameters may include settings for various adjustable devices in the vehicle. The adjustable devices may include mirrors, seats, a climate control, entertainment devices such as a radio, and safety devices, such as airbags. The vehicle-operator profile may include vehicle-operator information about the driver beyond the adjustable-vehicle related parameters, such as ergonomic data, identification information, financial information, route information, communication information, and information about passengers in the vehicle.

The driver may create a vehicle-operator profile using a computer acting as a profile-entry device. The driver may enter in data, such as height and weight information, in the vehicle-operator information described above. The vehicle-operator information may be stored in the vehicle-operator profile. The profile-entry device and/or a computer may also act as a profile-storage device and process the vehicle-operator information. One example of this processing is associating the vehicle-operator information with the driver, such as by storing a vehicle-operator profile containing the adjustable-vehicle-related parameters on the profile-entry device and/or the profile-storage device. Another example of processing is that the driver may indicate a temperature where an air conditioner (and/or a heater) of a climate control system should be activated. Then, the profile-entry device and/or the profile-storage device may compare environmental conditions, such as air temperature, where the vehicle is located and generate adjustable-vehicle related parameter(s) to activate the air conditioner (or heater) when the air temperature at the environment is above (or below) the indicated temperature.

A third example of processing includes generating the adjustable-vehicle-related parameters from the information in the vehicle-operator profile. The adjustable-vehicle-related parameters may be directly set from the vehicle-operator profile, such as a desired temperature as a climate-control parameter. Alternatively, the adjustable-vehicle-related parameters may be indirectly set from the vehicle-operator profile, such as by determining settings for an adjustable device based on ergonomic data of the driver (e.g., determine a driver's seat position based on the height, the weight, and/or the limb length of the driver). The adjustable-vehicle-related parameters may be determined via simulation, such as a simulation that allows the driver to adjust various adjustable devices in the vehicle. Then, after the driver indicates that the simulation is accurate, the adjustable-vehicle-related parameters may be set based on the simulated adjustments made during the simulation.

The profile-entry device and/or the profile-storage device may transmit the adjustable-vehicle-related parameters to the vehicle, either directly to one or more adjustable devices in the vehicle, or indirectly to a vehicle-setting-storage device. The vehicle-setting-storage device may be attached to the vehicle or may be a portable device that the driver carries into or near the vehicle. The vehicle-setting storage device may then transmit the adjustable-vehicle-related parameters to the adjustable devices of the vehicle.

After the adjustable-vehicle-related parameters are transmitted to an adjustable device, the adjustable device may adapt to the driver and/or to passengers of the vehicle using the adjustable-vehicle-related parameters. For example, a seat motor attached to a seat may receive one or more adjustable-vehicle-related parameters embodied in a request to move forward, move backward, or move to a fixed position. The seat motor may move the seat in accordance with the received request.

As vehicles become more under electronic control (e.g. drive-by-wire and brake-by-wire controlled), more adjustable devices may be added to the vehicle. For example, in a drive-by-wire system, a steering feel emulator may control the responsiveness of the steering wheel to road conditions and to the forces provided to the steering wheel. In a brake-by-wire system, a brake feel emulator may control the responsiveness of a brake pedal to road conditions and to the forces applied to the brake pedal. Other parameters, such as but not limited to an amount of available horsepower, suspension settings, transmission shift points, and brake feel may be adjustable by use of various adjustable devices.

The adjustable devices may have one or more adjustable-vehicle-related parameters to account for ergonomic factors of the driver, such as control devices (e.g., steering wheels and brakes) that may be adjusted to requires application of substantially less force than an average healthy person may provide (e.g., a steering wheel that may be adjusted to require much less force for an person driving with a broken arm). Further, the adjustable devices may have may have one or more adjustable-vehicle-related parameters to account for external conditions, such as a steering feel emulator or brake feel emulator with adjustable-vehicle-related parameters that permit more or less responsiveness to road conditions.

Once in the vehicle, the driver and/or the passengers may further adjust the adjustable devices in the vehicle. After these adjustments, the driver and/or the passengers may update the vehicle-operator profile based on the further adjustments. Then, each adjustable device may communicate one or more adjustable-vehicle-related parameters to the profile-storage device, perhaps via the profile-setting device. The transmitted one or more adjustable-vehicle-related parameters may represent current settings for the adjustable device (e.g., a seat position at the time of transmission). The profile-storage device may then store the transmitted adjustable-vehicle-related parameters in the vehicle-operator profile for the driver. The driver (or a passenger) may choose to update some, but not all, adjustable-vehicle-related parameters based on current settings of the adjustable devices, such as choosing to update a seat position but not a radio station.

The vehicle-operator profile may include communication subscription information, such as information about entertainment (e.g., satellite-radio-subscription information), telephone, other in-vehicle communications services (e.g., OnStar) and other communication services the driver may use. For one example, the communication subscription information may include telephone numbers, including cellular phone numbers, that the driver may use to communicate with other and/or to forward calls received at other numbers to a telephone usable within the vehicle. For another example, a driver of a rental vehicle may have a satellite radio subscription. The vehicle-operator profile for the driver may store satellite-radio-subscription information. Then, the satellite-radio-subscription information may be provided to a satellite-radio receiver within the rented vehicle to permit use of the satellite radio reception in the rented vehicle.

A stored vehicle-operator profile associated with a driver may be retrieved from a profile-storage device. The stored vehicle-operator profile may be retrieved in response to a query for the vehicle-operator profile that provides the name or other identification information for the driver. If the driver uses a type of vehicle other than the type of vehicle indicated in the stored vehicle-operator profile, the adjustable-vehicle-related parameters of the stored vehicle-operator profile may be adapted for use in the new type of vehicle. The adjustable-vehicle-related parameters may be adapted for use in the new vehicle based on user input, perhaps via data entry or a simulation discussed above. In addition, the adjustable-vehicle-related parameters may be adapted for use without input from a person, such as calculating the appropriate adjustable-vehicle-related parameters based on ergonomic data about the driver and the new type of vehicle. Further, if a driver typically uses two (or more) types of vehicles, adjustable-vehicle-related parameters for each type of typically-used vehicle may be stored in the vehicle-operator profile.

For example, suppose a car rental company stores vehicle-operator profiles for each person renting a car. A vehicle-operator profile may have data about a customer who rented and then drove a first car. The set of adjustable-vehicle-related parameters in the stored vehicle-operator profile for customer may indicate that they are also associated with the first car. Suppose the customer later rents a second car from the car rental company. The set of adjustable-vehicle-related parameters for the customer may be updated by data entry from the customer (or another person) by simulating the second car, and/or from calculating adjustable-vehicle-related parameters for the second car based on the customer's ergonomic data and information about the second car (such as distance from the steering wheel to the front of the seat, mirror settings, etc.).

The updated set of adjustable-vehicle-related parameters (for the second car) may replace the set of adjustable-vehicle-related parameters for the first car or the updated adjustable-vehicle-related parameters for the second car may be stored separately from the adjustable-vehicle-related parameters for the first car. If multiple sets of adjustable-vehicle-related parameters are stored in a vehicle-operator profile, a choice of a particular set of adjustable-vehicle-related parameters may be made before downloading or uploading a set of adjustable-vehicle-related parameters to a vehicle.

In addition, a vehicle may be customized for a driver before the driver uses the vehicle. For example, a military motor pool may determine adjustable-vehicle-related parameters for each driver either before or at the time of vehicle use. Then, before a driver picks up the vehicle, motor pool personnel may download the adjustable-vehicle-related parameters to the vehicle, perhaps using a convoy planning tool and/or a vehicle deployment planning system. The convoy planning tool and the vehicle deployment planning system are described in U.S. patent application Ser. No. 11/955,198 entitled "Vehicle Deployment Planning System," filed on Dec. 12, 2007, the entire contents of which are incorporated by reference herein. Once the adjustable-vehicle-related parameters are communicated to adjustable devices in the vehicle, the adjustable devices may adapt and thus customize the vehicle for the driver's use, perhaps before the driver first starts the vehicle. As such, the invention can provide a more comfortable and safer vehicle for the driver, as well as saving driver time and inconvenience in adjusting a vehicle for the driver's use.

In addition, if a particular vehicle is unavailable, information from the vehicle-operator profile may be used to select or suggest an alternative vehicle. For example, a driver may indicate one or more favorite types of vehicles in their vehicle-operator profile. As another example, ergonomic data stored in a vehicle-operator profile about a driver may be used to suggest one or more vehicles based on an ease-of-use estimate. The ease-of-use estimate may take into account the height, weight, limb length and other ergonomic data to indicate a vehicle's relative ease of drivability and accessibility (e.g., ease of entry to and exit from the vehicle).

An Example Vehicle-Operator-Profile System

Turning to the figures, FIG. 1 shows an example vehicle-operator-profile system 100 with a profile-storage device 110, a profile-entry device 112, and a vehicle 120. The vehicle 120 contains a vehicle-setting storage device 130 and various adjustable devices, including a power seat motor 140, a mirror motor 152, an entertainment device 160, and a steering wheel 170. A driver of the vehicle may use the profile-entry device 110 and/or the profile-storage device 112 to enter information about the driver. The profile-storage device 110, a profile-entry device 112, and the vehicle-setting-storage device 130 are shown connected by a data network 180.

The profile-storage device 110 may store one or more vehicle-operator profiles 114. One or more vehicle-operator profiles 114 may be stored on the profile-entry device 112 as well. The profile-storage device and/or profile-entry device 112 may store the vehicle-operator profiles in a data structure suitable also to permit association of a vehicle-operator profile with a specific driver and/or a specific vehicle and to permit queries for retrieval of vehicle-operator profiles. The data structure may a data base, such as a relational or hierarchical data base, a trie, a tree, a list, a queue, an array, other similar data structures, and/or combinations of these data structures.

The driver or other user of the vehicle 120 may adjust various devices within the vehicle 120. The power seat motor 140 may be used to move the seat 144. The example seat 144 shown in FIG. 1 may be moved along two degrees of freedom (DOFs): along a degree of freedom 144 in the direction toward or away from the steering wheel 170, and along degree of freedom 146 in the vertical direction. If the seat is heated, a heating device of the seat may be turned on, turned off and/or adjusted for suitable temperature. The mirror 150 may be moved using the mirror motor 152. The steering wheel 170 may be adjusted in a similar fashion to the seat 144 to telescope in or out and/or in a vertical direction to raise or lower the steering wheel using a steering-wheel motor (not shown).

The entertainment device 160 may comprise a radio. The driver or other user of the vehicle 120 may select a radio frequency to be played on entertainment device 160 and/or change other radio settings such as preset-station information and sound-related settings (e.g., volume, balance, tone, bass, and treble). The entertainment device 160 may comprise a television. The driver or other user of the vehicle 120 may select a television frequency to be played on entertainment device 160 and/or change other television settings such as preset-station information and sound-related and/or video-related settings (e.g., color, brightness, and contrast).

In addition, the entertainment device 160 may comprise a compact disc (CD) player, a MP3 player, cassette-tape, or other stored-audio player. The driver may select stored-audio data (e.g., one or more recorded songs) to be played on the stored-audio player. The stored-audio player and/or removable media (e.g., a memory card or CD) readable by the stored-audio player may store the stored-audio data. The stored-audio data may be downloaded from a data network (e.g., the Internet) and perhaps subsequently stored on the stored-audio player. Also, the stored-audio player may permit changing of sound-related settings.

The entertainment device 160 may include a stored-video player, where the driver or other user of the vehicle 120 may select stored-video data (e.g., a movie) to be played. The stored-video data may be stored in within the stored-video player, stored in removable media (e.g., a DVD) readable by the stored-audio player, or may be downloaded to (and perhaps subsequently stored on) the stored-video player from a data network such as the Internet. In addition, the video player may permit changing of sound-related and/or video-related settings.

One or more adjustable-vehicle-related parameters may indicate the adjustments of the various devices within the vehicle. The adjustable-vehicle-related parameters may include parameters and/or other information to request the power seat motor 140 move the seat 142 along degree of freedom 144 and/or degree of freedom 146. The adjustable-vehicle-related parameters may include parameters or other information to request that the mirror motor 152 moves the mirror 150 along one or more degrees of freedom as well, and may also include parameters and/or other information to control the entertainment device 160. The adjustable-vehicle-related parameters may include parameters and/or other information to control other adjustable-devices present in a vehicle, such as, but not limited to, seat heaters, remote engine starters, and windshield wipers.

One or more adjustable-vehicle-related parameters may be sent to the vehicle-setting storage device 130 and/or directly to adjustable device(s) in the vehicle 120. FIG. 1 shows dotted lines indicating communication paths from the profile-entry device 112 and the profile storage device 110 to the vehicle-setting-storage device 130 and the entertainment device 160. FIG. 1 also shows the vehicle-setting-storage device 130 connected to the various adjustable devices in the vehicle 120, including the power seat motor 140, the mirror motor 152, and the entertainment device 160. Also, one or more of the adjustable devices in the vehicle may each send one or more adjustable-vehicle-related parameters, perhaps upon request or periodically, to the vehicle-storage-setting device 130. In this fashion, the vehicle-storage-setting device 130 may determine and communicate current values of the adjustable-vehicle-related parameters for adjustable devices in the vehicle.

The profile-storage device 110, profile-entry device 112, and/or vehicle-setting-storage device 130 may be connected via a data network 180. The data network 180 may be a local area network (LAN), wide area network (WAN), private data network, and/or a public data network, such as the Internet. Alternatively, the profile-storage device 110, profile-entry device 112, and/or vehicle-setting-storage device 130 may be directly connected rather than connected via the data network 180

As such, a user of the profile-storage-device 110 and/or profile-entry device 112 may remotely provide adjustable-vehicle-related parameters to a vehicle. For example, a driver may rent a car at home 116 via the Internet (e.g., using a home computer as a profile-entry device 112). While FIG. 1 shows home 116 with a profile-entry device 112, it is to be understood that home 116 may represent any location remote from the vehicle, such as, but not limited to, a work place, a hotel/motel, a car-rental agency location, and/or a motor pool or fleet office. It is also to be understood that the profile-storage device 110 may be at home 116 as well or instead of profile-entry device 112.

The connections between the profile-entry device 112, profile-storage-device 110, data network 180, the vehicle-setting-storage device 130, and/or the adjustable devices in the vehicle 100 may be secured or unsecured. If the connections are secured, they may be secured using communication-security techniques such as, but not limited to, Secure Sockets Layer (SSL), Transport Layer Security (TLS), Secure Shell (SSH), Virtual Private Network (VPN), IP Security (IPSec), Trusted Computer System Evaluation Criteria (TCSEC)/Orange Book techniques, ISO/IEC 15443, 15408 and/or 17799 techniques, public/private key techniques such as the RSA algorithm, and other cryptographic algorithms.

At that time or previously, the driver may specify information to be stored in a vehicle-operator profile, perhaps using screen 200 and/or screen 250 described below with respect to FIGS. 2A and 2B respectively, used to generate adjustable-vehicle-related parameters for the rented vehicle. The profile-storage-device 110 and/or profile-entry device 112 may store the vehicle-operator profile, including the adjustable-vehicle-related parameters. The profile-storage-device 110 and/or profile-entry device 112 may send the adjustable-vehicle-related parameters, perhaps at a later time (e.g., at or near the time the driver rents the vehicle), via the data network 180 to the rented vehicle.

When the rented vehicle is returned, the profile-storage-device 110, profile-entry device 112, and/or the vehicle-setting-storage device 130 may send one or more requests with values from a default set of adjustable-vehicle-related parameters to the adjustable devices within the rented vehicle. The default set of adjustable-vehicle-related parameters may set the adjustable devices to a set of factory-suggested values and/or to a set of values determined by the owner of the vehicle. Other default sets of adjustable-vehicle-related parameters are possible as well.

Also, any information in the vehicle-operator profile (e.g., financial information and communication-subscription information) for the driver and/or passengers of the rented vehicle may be deleted from the vehicle and/or the setting-storage device 130 when the rented vehicle is returned. The vehicle-operator profile information may be removed automatically (e.g., at the same time the default set of adjustable-vehicle-related parameters is sent to the vehicle) or manually, such as by the driver and/or passengers of the rented vehicle indicating that the information in the vehicle-operator profile is to be deleted from the vehicle.

Example Vehicle-Operator-Profile Entry Screens

Figure 2A:
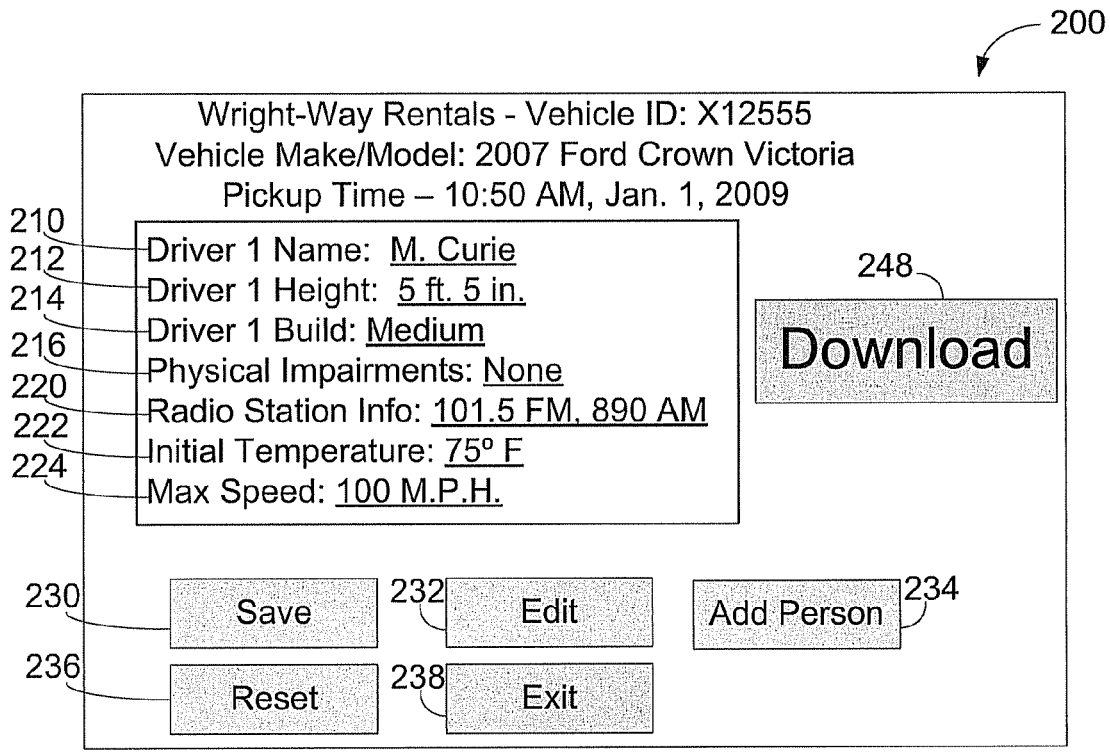
FIG. 2A shows an example screen for the profile-entry device, in accordance with embodiments of the invention.

FIG. 2A shows an example screen 200 allowing a user of a vehicle, such as a driver, to enter data about the user, in accordance with embodiments of the invention. The screen 200 and/or the profile-entry screen 250, described below with respect to FIG. 2B, may be generated by rendering a web page with a web browser (perhaps over a data network such as the Internet), displaying a screen or view of a standalone software application, or by use of similar technologies capable of displaying the screen 200 and/or the profile-entry screen 250.

FIG. 2A shows example user data as underlined, such as a user's name 210, user's height 212, user's build 214, user's physical impairments 216, radio station information 220, an initial temperature for the climate control device 222, and a maximum speed of the vehicle 224. The data may be entered and/or buttons selected with an input device, such as the input unit described with respect to FIG. 5.

The user's height 212, user's build 214, and/or physical impairments 216 may be treated as ergonomic data to determine one or more adjustable-vehicle related parameters. For example, based on values entered in for the user's height 212, a limb length, such as a leg length or arm length, may be estimated. Then, based on the limb length(s) and/or ergonomic data, one or more adjustable-vehicle-related parameters may be determined, such as a seat position or steering-wheel position. The physical impairments of the user may be used to determine adjustable-vehicle related parameters. For example, if the user has an injured arm, the steering wheel may be adjusted to be closer to the user than if the user's arm was not injured. While FIG. 2A shows the user's height 212, user's build 214, and physical impairments 216 as data entry fields for ergonomic data, other data entry fields for ergonomic data may supplement these data entry fields as well, such as data entry fields for a user's weight, and limb (arm or leg) length(s).

The ergonomic data stored in a vehicle-operator profile about a driver may be used to suggest one or more vehicles. The vehicles may be suggested based on an ease-of-use estimate. The ease-of-use estimate may take into account the height, weight, limb length and other ergonomic data to indicate a vehicle's relative ease of drivability and accessibility (e.g., ease of entry to and exit from the vehicle). For example, if a person is 140 cm tall, the ease-of-use estimate may indicate that a vehicle with relatively high ground clearance (e.g., a truck) may be more difficult for the person to drive and access for the person than a vehicle with relatively low ground clearance (e.g., a sedan or sports car).

The profile-entry device 110 and/or profile-storage device 112 may process each vehicle on an available-vehicle list to generate suggested vehicles for a driver. The available-vehicle list may be a list of vehicles currently available for use, such as a list of available rental cars at a particular rental location. The profile-entry device 110 and/or profile-storage device 112 may generate ease-of-use estimates for each vehicle on the available-vehicle list based on a vehicle-operator profile for a driver. Then, the profile-entry device 110 and/or profile-storage device 112 may suggest one or more vehicles from the available-vehicle list to the driver based on the ease-of-use estimate. For example, the available-vehicle list may be sorted by ease-of-use estimate and the top N (N>=1) vehicles in the sorted list may be presented to the driver as a suggested-vehicle list. Then, the driver can select a vehicle for use, perhaps from the suggested-vehicle list.

The screen 200 may permit entry of user entertainment and comfort settings. FIG. 2A shows the radio station information 220 indicating AM and FM radio station settings. The screen 200 may permit entering other entertainment settings such as, but not limited to: (a) other radio settings, (b) settings for entertainment devices such as CD players, Digital Video Disc (DVD) players, etc., and (c) requesting music and/or video to be downloaded to an MP3-player or other entertainment device aboard the vehicle.

The screen 200 may permit entering comfort settings, such as an initial temperature 222 and/or parameters for a heating device of a seat in the vehicle. The screen 200 may permit entering the maximum speed of the vehicle 224 to inhibit the vehicle from exceeding the entered maximum speed.

Various screen control buttons may be provided for the screen 200. FIG. 2A shows a save button 230 for saving the data entered into the screen 200, an edit button 232 allowing editing of data on the screen 200, an add person button 234 for adding information about another driver or passenger, a reset button 236 to reset and/or clear the data entered in screen 200 as well as setting some or all adjustable-vehicle-related parameters to default values, and an exit button 238 to leave the screen 200. Other screen control buttons are possible as well. When the save button 230 is pressed, the data entered in via the screen 200 may be saved in a vehicle-operator profile, such as described with reference to FIG. 6. The data may be saved on the profile-entry device 112 and/or on the profile-storage device 110.

The data saved in the vehicle-operator profile may be processed as well. One example of processing data is to store the profile with driver information, such as name or other identification information, to associate the driver with the vehicle-operator profile. Another example of processing data is to determine one or more adjustable-vehicle-related parameters based on environmental conditions, such as setting adjustable-vehicle-related parameters for a climate control system based on the air temperature and/or humidity. The environmental conditions may be determined based on sensors in the vehicle, from user data, or from requesting information about environmental conditions from outside data sources, such as data sources available from the Internet.

Another example of processing data may include determination of one or more adjustable-vehicle-related parameters, such as by determining adjustable-vehicle-related parameters based on ergonomic data. For example, suppose a vehicle contains an adjustable seat with three fixed positions. In seat position 1, the adjustable seat is generally suitable for persons with a leg length of 30" or less, in seat position 2, the adjustable seat is generally suitable for persons with a leg length between 30" and 33", and seat position 3 is generally suitable for persons with leg lengths longer than 33". Also, suppose a driver has an entered ergonomic data into a vehicle-operator profile indicating a height of 5'10". Further, suppose that the average person of that height has a 32" leg. Then, upon saving the profile data for the driver, the profile-entry device 110 and/or profile-entry device 112 may process the vehicle-operator profile for the driver to: (a) determine an estimated leg length of the driver based on the entered height of the driver, (b) determine that seat position 2 is suitable for the driver based on the estimated leg length, and (c) update the adjustable-vehicle-related parameters in the vehicle-operator profile for the driver to indicate to a power seat motor for the driver's seat to be set to seat position 2.

FIG. 2A shows a download button 248. When the download button is pressed, one or more adjustable-vehicle-related parameters may be determined based on the data entered via screen 200. Then, the adjustable-vehicle-related parameters may be sent from the profile-entry device 112 (or the profile-storage device 110) to a vehicle, such as vehicle 120.

Figure 2B:
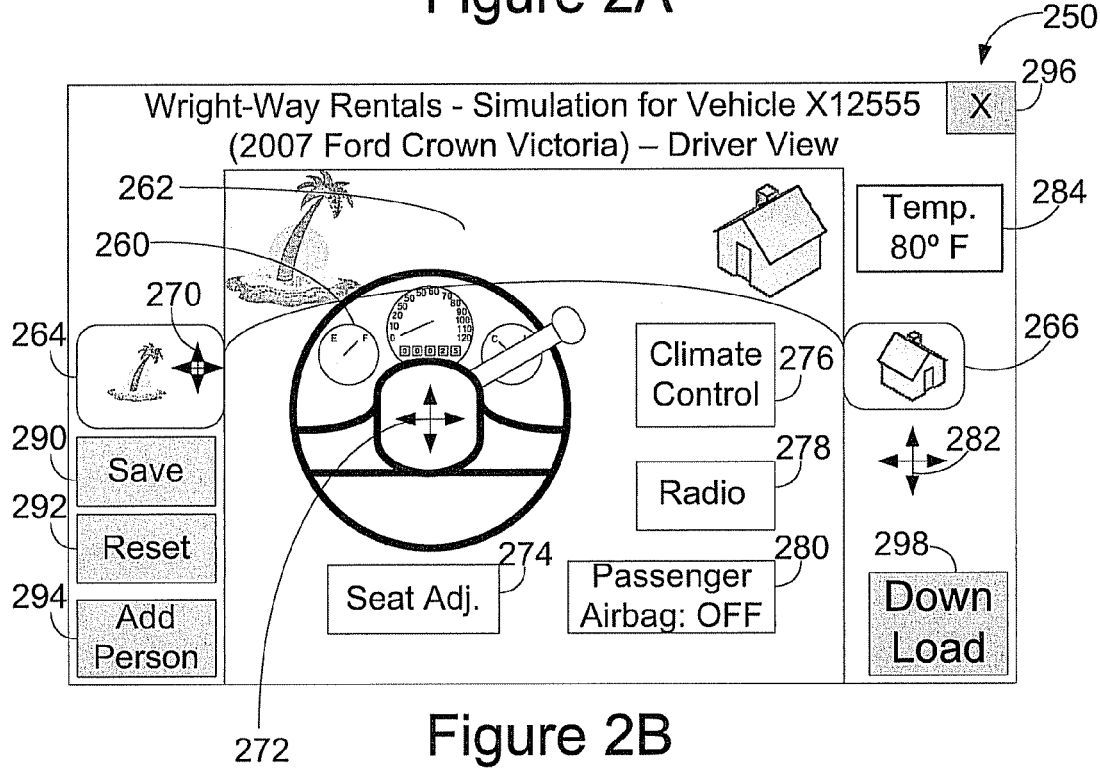
FIG. 2B shows an example profile-entry screen indicating a simulation of a vehicle, in accordance with embodiments of the invention.

FIG. 2B shows an example profile-entry screen 250 indicating a simulation of a vehicle with a simulated dashboard 260, front view 262, left-mirror view 264, and right-mirror view 266, in accordance with embodiments of the invention. The simulation may be based on ergonomic data. For example, an initial seat position may be determined based on ergonomic data of a user. Then, based on the initial seat position, the simulated views 262, 264, and 266 may be initially drawn from a point of view where the user is sitting in the initial seat position.

The profile-entry screen 250 shows a simulated vehicle dashboard 260 with gauges such as a speedometer, fuel gauge, and thermostat as may be found it the actual vehicle. A simulated front view 262 may be provided to show a user of the profile-entry screen 250 the view from the point of view of a driver. The profile-entry screen 250 may present simulated left-mirror view 264 of the left mirror and/or right-mirror view 266 of the right mirror as well. The profile-entry screen 250 may update the simulated views 262, 264, and 266 based on adjustments made by the user.

FIG. 2B shows various adjustable-device controls, including left-mirror control 270, steering-wheel control 272, seat-adjustment control 274, climate-control control 276, radio control 278, passenger-airbag control 280, and right-mirror control 282. The left-mirror control 270 and the right-mirror control 282 control the left mirror and the right mirror, respectively of the vehicle. When the user of the screen 250 uses the left-mirror control 270 or right mirror control 282 to adjust the left mirror or right mirror, respectively, the left-mirror view 264 or the right mirror view 266 may be adjusted in accordance with the actions of the user. In addition, one or more adjustable-vehicle-related parameters may be updated in accordance with actions of the user. The seat-adjustment control 274 may adjust a seat position of a driver or a passenger with an adjustable seat. Similarly, the front view 262, left-mirror view 264, and/or right-mirror view 266 may be adjusted when the seat-adjustment control 274 is used, as the point of view of the user of the vehicle may change as the seat position changes and thus view(s) of the user may change as well. Further, the screen 250 may change the point of view based on which user is adjusting the controls. For example, the screen 250 may display the point of view of a driver or of a passenger in the front or back seat of the vehicle.

When the user selects a control, one or more additional screens may be displayed. The user may select a control using an input device, such as an input unit described with respect to FIG. 5. For example, a screen with a climate control device as equipped in the vehicle may be displayed in response to the user selecting the climate-control control 276. Similarly, a screen showing an example radio as equipped in the vehicle may be displayed in response to the user selecting the radio control 288. Alternatively, additional screens that allow textual data entry, such as FIG. 2A, may be displayed in response to the user selecting a control. Additional sub-controls may also be displayed in response to selecting a control. For example, additional sub-controls representing degrees of freedom for a seat, similar to the arrows used for left-mirror control 270, may be displayed when the user selects the seat-adjustment control 274. Some controls may toggle when selected, such as the passenger-airbag control 280.

Additional information may be displayed as well. FIG. 2B shows temperature 284 displayed, which may aid the user in setting the climate-control control 276. Other information, such as, but not limited to, more environment conditions (e.g., humidity and wind conditions) and route information may be displayed on the screen 250 as well.

Various input devices may be used to provide user feedback. For example, in a vehicle equipped with a drive-by-wire system, the "feel" or responsiveness of the steering wheel may be controlled by an adjustable device, such as a steering feel emulator. A computer-steering-wheel device may be used to simulate the feel of the steering wheel as various adjustable-vehicle-related parameters are changed for the steering feel emulator. Similarly, computer-pedal devices may be used to simulate the feel of brakes in a brake-by-wire system when adjusting a brake feel emulator.

Screen control buttons may be displayed on the screen 250. The save button 290, add person button 294, exit button 296, and download button 298 may perform the same or similar functions to the save button 230, add person button 234, exit button 238, and download button 248, each respectively described above with respect to FIG. 2A. The reset button 292 may restore the simulation shown in screen 250 to a set of default values, as well as setting some or all adjustable-vehicle-related parameters to default values.

An Example Vehicle-Setting-Storage Device

Figure 3:
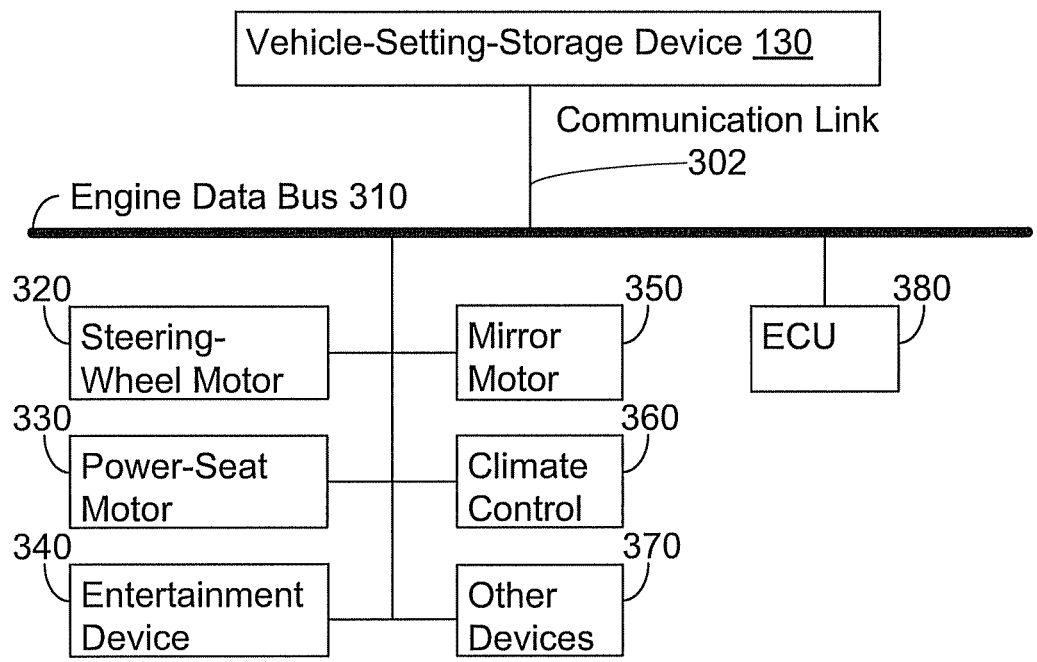
FIG. 3 is a block diagram of an example vehicle, in accordance with embodiments of the invention.

FIG. 3 is a block diagram depicting the vehicle-setting-storage device 130 connected via engine data bus 310 to several adjustable devices, including a steering-wheel motor 320, a power-seat motor 330, a entertainment device 340, a mirror motor 350, a climate control 360, and other devices 370. FIG. 3 also shows the vehicle-setting-storage device 130 connected to an engine control unit (ECU) 380.

FIG. 3 shows the vehicle-setting-storage device 130 connected to the adjustable devices 320-370 via a communication link 302. The communication link 302 is configured to communicate requests to the adjustable devices 320, 330, 340, 350, 360 and 370 and the ECU 380 and responses from the adjustable devices 320, 330, 340, 350, 360 and 370 and the ECU 380. FIG. 3 shows the communication link 302 connected to the engine data bus 310, which is then connected to the adjustable devices 320-370 and the ECU 380. Alternatively, the vehicle-setting-storage device 130 may directly connect to one or more of the adjustable devices 320-370 and/or the ECU 380 via communication link 302 without connecting to the engine data bus 310.

The communication link 302 may be wired or wireless. If the communication link 302 is a wired connection, the communication link 302 may be a wire, a ribbon connector, electrical cable, coaxial cable, fiber optic cable, and/or a connection compliant to the ISO 11898 standard for controller area networks. If the communication link 302 is a wireless connection, then the vehicle-setting-storage device 130 preferably utilizes one or more wireless interface devices compliant with the Institute of Electrical and Electronics Engineers (IEEE) 802.15.4 ("ZigBee") standard. Other wireless interfaces, such as an IEEE 802.11 standard ("Wi-Fi") or IEEE 802.16 standard ("WiMAX") compliant device for longer range connections, may be used to provide the communication link 302.

The vehicle-setting-storage device 130 may be configured to send one or more requests to each of the adjustable devices. Each request may comprise information based on one or more adjustable-vehicle-related parameters for the specific adjustable device. For example, a request to adjust the steering-wheel motor 320 may include a request with one or more adjustable-vehicle-related parameters for the steering-wheel motor, such as parameters expressing the tilt and the telescope positions of the steering wheel.

In response to receiving a request, an adjustable device 320, 330, 340, 350, 360 or 370 may alter its functionality. For example, a request to the entertainment device 340 to play a radio with one or more adjustable-vehicle-related parameters expressing a desired frequency to be played may cause the entertainment device 340 to play the radio at the desired frequency.

FIG. 3 shows the ECU 380 connected to the engine data bus 310. The ECU 380 may control a maximum speed of a vehicle. For example, the ECU 380 may control the maximum speed of the vehicle by controlling a maximum fuel rate to be delivered to an engine of the vehicle. Other techniques for controlling the maximum speed of the vehicle are possible as well.

The vehicle-setting-storage device 130 may send one or more requests to the ECU 380 to set the maximum speed for the vehicle. The maximum speed of the vehicle may be specified in one or more adjustable-vehicle-related parameters. In response to receiving the request(s), the ECU 380 may control the engine of the vehicle so that the engine of the vehicle does not exceed the specified maximum speed and/or may send a response. The response may indicate that maximum speed was set, the maximum speed was not set, and/or may indicate a value of an actual maximum speed. For example, if a request to set the maximum speed of a vehicle was sent for a maximum speed of 200 km/h, but the ECU 380 was programmed to only allow a maximum speed of 180 km/h, the ECU 380 may either (i) reject the request to set the maximum speed and send a response that the maximum speed was not set or (ii) may accept the request and indicate the actual maximum speed was set to 180 km/h.

The functionality of the vehicle-setting-storage device 130 may be incorporated into a sensor interface and/or other components of the MS-alert apparatus described in detail in U.S. patent application Ser. No. 12/022,859 entitled "Apparatus, System, and Method for Onboard Degraded and Deadlined Mechanical System Alerting" filed on Jan. 30, 2008, the entire contents of which are incorporated by reference herein.

An Example On-Board Display

Figure 4:
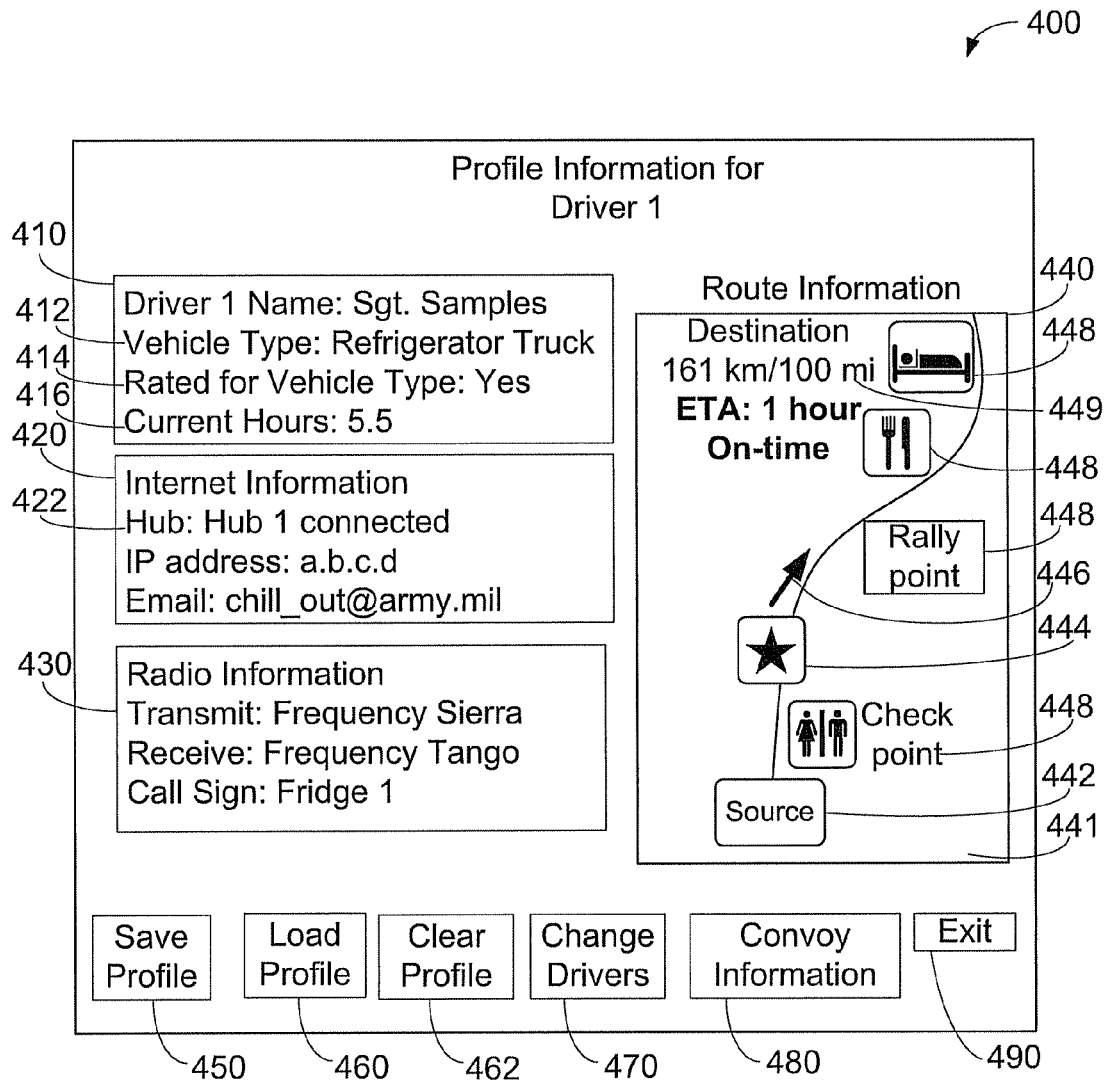
FIG. 4 is an example on-board display with profile information for a driver of a vehicle, in accordance with embodiments of the invention.

FIG. 4 shows an example on-board display 400 with profile information for a driver of a vehicle in accordance with embodiments of the invention. The on-board display 400 may be generated by a computing device and displayed on an output unit of the computing device that is inside the vehicle, such as the vehicle-setting-storage device, the profile-storage device, the profile-entry device, the convoy planning tool and/or the vehicle deployment planning system; the latter two of which are described in U.S. patent application Ser. No. 11/955,198. The on-board display 400 may be generated by rendering a web page with a web browser, displaying a screen or view of a standalone software application, or by use of similar technologies capable of displaying the on-board display 400. Further, the on-board display 400 may be displayed outside the vehicle, such as at a fleet-management location or headquarters to provide information about a vehicle in transit.

The on-board display 400 may provide information such as driver information 410, Internet information 420, radio information 430, and route information 440. The driver information 410 may include identification information, such as a name of a driver. Other identification information about the driver, such as an employee identification number, a driver number, or a Social Security Number, may be provided on on-board display 400 as well as or instead of the name.

The driver information 410 may include vehicle information, such as vehicle type 412. The vehicle type 412 may be based on cargo carried by the vehicle (e.g., "Cattle Truck"), the size of the vehicle (e.g., "18 Wheeler #1"), a make and/or model of the vehicle, a color of the vehicle, a vehicle identifier such as a vehicle identification number (VIN), a company identification number, a license plate number, and/or a pre-assigned code for the vehicle (e.g., "BR-548", "Tanker", or "Truck #2"), and/or on any combination thereof (e.g., "Cattle Truck BR-548"). Many other vehicle types are possible as well. Other information about the vehicle may be provided as well as part of on-board display 400, such as but not limited to, maintenance information (e.g., repair records, model information, parts information, and/or estimated time/mileage for repairs) and/or financial information.

The driver information 410 may have information about the qualifications of the driver. FIG. 4 shows rating information 414 that indicates that the driver, Sgt. Samples, is qualified to drive a refrigerator truck. The rating information 414 may be in the form of a list of driver qualifications (e.g., "Driver 1 Qualification List: Cars, Buses, and Commercial Trucks"). The driver information 410 may have information about the working time of the driver. FIG. 4 shows drive time 416 that indicates that the driver has been currently driving for 5.5 hours. Other work-related information may be provided on on-board display 400 instead of or as well, such as, but not limited to, employee identification information, driver's license information, and/or rank information.

The Internet information 420 may include information about an Internet connection to the vehicle. The vehicle may be connected to a data network, such as a LAN, WAN, private data network, or public data network such as the Internet. The connection may be established and maintained via an en route communications method. An exemplary method for providing en route communications is by use of a configuration aware packet routing method. U.S. patent application Ser. No. 11/613,749 entitled "Voice-Over-Internet Protocol Intra-Vehicle Communications," filed on Dec. 20, 2006 and published as U.S. Patent Application Publication Number 2008/0151793 on Jun. 26, 2008, U.S. patent application Ser. No. 11/613,700 entitled "Distance Adaptive Route Protocol" filed on Dec. 20, 2006 and published as U.S. Patent Application Publication Number 2008/0151889 on Jun. 26, 2008, and U.S. patent application Ser. No. 11/613,730 entitled "Configuration Aware Packet Routing in an Ad-Hoc Network," filed on Dec. 20, 2006 and published as U.S. Patent Application Publication Number 2008/0151841 on Jun. 26, 2008, describe exemplary configuration aware packet routing methods. The entire contents of the three aforementioned patent applications are incorporated by reference herein. The vehicle may connect to a data network via other en route communications methods, such as a connecting to a network device using a Wi-Fi and/or WiMAX protocol.

The Internet information 420 may include device information 422 that indicates connection information such as the "Hub 1 connected" display. The Internet information 420 may also include device status information, device hardware information and/or device software information. The Internet information 420 may include connection information, such as the IP address shown in FIG. 4, media access layer (MAC) connection information, Ethernet information, physical layer connection information, among others. The Internet information 420 may include information about the driver of the vehicle, such as but not limited to the e-mail address shown in FIG. 4, instant messaging information, and/or access information for various data networks (e.g., user identification and/or password information to connect to a private data network, such as a company network).

The radio information 430 may include information about radio frequencies. As shown in FIG. 4, the radio information 430 includes information about a transmit frequency and a receive frequency. The information about radio frequencies may also or instead include numerical frequency information (e.g., "193.1 MHz") and may have information about a simplex or duplex status of the frequency. The radio information 430 may include information about the driver, including a radio call sign as shown in FIG. 4.

The route information 440 may include a map 441. The map 441 may display a route including source information 442, current position information 444, direction of travel information 446, en route information 448, and destination information 449. Source information (Src) 442 may indicate a location and possibly other features of the source of the route, such as, but not limited to, amenities available at the source, timing information (e.g., depart at 0800), and/or a name of the source. The current position information 444 may be displayed on the route information 440. A location device, such as described below with respect to FIG. 5, may determine the current position information 444. The direction of travel information 446 may be determined by use of a compass or similar device and/or by determining a direction based on the current position information 444 and information about previous position(s) of the vehicle.

The en route information 448 may include information about amenities along the route. FIG. 4 shows en route information 448 about service facilities located at the "Check Point", a restaurant, and a hotel along the route. The en route information 448 may also indicate other information, such as convoy-related information such as check points and rally points. Many other types of en route information 448 are possible as well.

The destination information 449 may include location information. FIG. 4 shows destination information 449 located at the hotel at the top of the map 441, indicating the location of the destination. The destination information 449 may include distance and/or travel-time information as well. The distance information may be determined based on the current location information 444 and/or the source 442. The travel-time information may provide an indication of estimated time to arrival (ETA), such as the "ETA: 1 hour" indication shown in FIG. 4, estimated travel time, and may be expressed numerically or categorically. As example categories, the travel-time may be categorized relative to a schedule as "On-time", "Ahead of Schedule", or "Behind Schedule." FIG. 4 shows destination information 449 with a travel-time category of "On-time". Other travel-time categories are possible as well.

The on-board display 400 may comprise various controls as well. FIG. 4 shows a save-driver-profile button 450, a load-driver-profile button 460, a clear-driver-profile button 462, a change-drivers button 470, a convoy-information button 480, and an exit button 490. The save-driver-profile button 450, when selected, may save adjustable-vehicle-related parameters to a vehicle-operator profile, such as described with reference to FIG. 6. The adjustable-vehicle-related parameters may be based on current settings of one or more adjustable devices within the vehicle. For example, if the driver of the vehicle adjusts a driver's seat while using the vehicle, the setting of the driver's seat may be stored (along with information about other adjustable devices in the vehicle) as one or more adjustable-vehicle-related parameters upon selection of the save-driver-profile button 450.

The adjustable-vehicle-related parameters may be determined by requesting each adjustable device to provide one or more adjustable-vehicle-related parameters related to the adjustable device. Once the adjustable device responds to the request with one or more adjustable-vehicle-related parameters, the adjustable-vehicle-related parameters may then be stored. Other techniques for determining the adjustable-vehicle-related parameters to be stored are possible as well.

The load-driver-profile button 460, when selected, allows a user of the vehicle to retrieve adjustable-vehicle-related parameters stored with the vehicle-operator profile of the driver. The retrieved adjustable-vehicle-related parameters may then be sent to the vehicle, perhaps as one or more requests containing adjustable-vehicle-related parameter(s) to alter the performance of the adjustable device.

The clear-driver-profile button 462, when selected, allows a user of the vehicle to delete information about the driver from the vehicle. The user may select the clear-driver-profile button 462 to remove information, such as financial information or communication subscription information (e.g., satellite-radio subscription information) that may be stored in a vehicle-operator profile from the setting-storage-device 130 and/or the various adjustable devices of the vehicle. The use of the clear-driver-profile button 462 permits the user of the vehicle to secure the information from a person who later drives the same vehicle (e.g., a later renter of a rental car or another later driver of a military vehicle).

The change-drivers button, 470, when selected, allows changing of drivers from a current driver to a new driver. First, information may be entered about the new driver and a vehicle-operator profile associated with the new driver may be retrieved. Information about the current driver may be removed from the vehicle, as indicated in the discussion above about the clear-driver-profile button 462. Subsequently, the adjustable devices in the vehicle may be adjusted based on adjustable-vehicle-related parameters in the new driver's vehicle-operator profile.

Some or all of the adjustable devices may be adjusted based on the new driver profile. For example, the on-board display 400 may display a sub-screen that allows the new driver (or another person) to select each adjustable device to be adjusted based on the vehicle-operator profile. For example, the sub-screen may display a series of selection boxes that allow the new driver to select each adjustable device to be updated. The choices made in the selection boxes may allow adjustment of only the selected adjustable devices (e.g., adjust the driver's seat but not the entertainment device based on the new driver's adjustable-vehicle-related parameters).

For example, suppose a vehicle is equipped with an adjustable driver's seat currently at seat position 1. A user of the vehicle may save the current driver's seat position (among other adjustable-vehicle-related parameters) to the vehicle-operator profile for the driver by selecting the save-driver-profile button 450. Suppose the driver's seat position later moves to seat position 2. The user of the vehicle may choose to save the current driver's seat position (seat position 2) to the vehicle-operator profile for the driver by selecting the save-driver-profile button 450 or may restore the driver's seat to its previously saved position (seat position 1) by selecting the load-driver-profile button 460. Later, suppose a second person will to drive the vehicle. Further suppose the second person has a vehicle-operator profile with stored adjustable-vehicle-related parameters indicating the driver's seat is in seat position 3. Then, by selecting the change-drivers button 470 and entering in the information about the second driver, the driver's seat may then be adjusted to seat position 3 as stored in the new driver's vehicle-operator profile.

The convoy-information button 480, when selected, may provide access to the convoy planning tool and/or the vehicle deployment planning system described in U.S. patent application Ser. No. 11/955,198. The exit button 490, when selected, may terminate the on-board-display 400. Information about the current driver may be removed from the vehicle, as indicated in the discussion above about the clear-driver-profile button 462, when the exit button 490 is pressed as well.

An Example Computing Device

Figure 5:
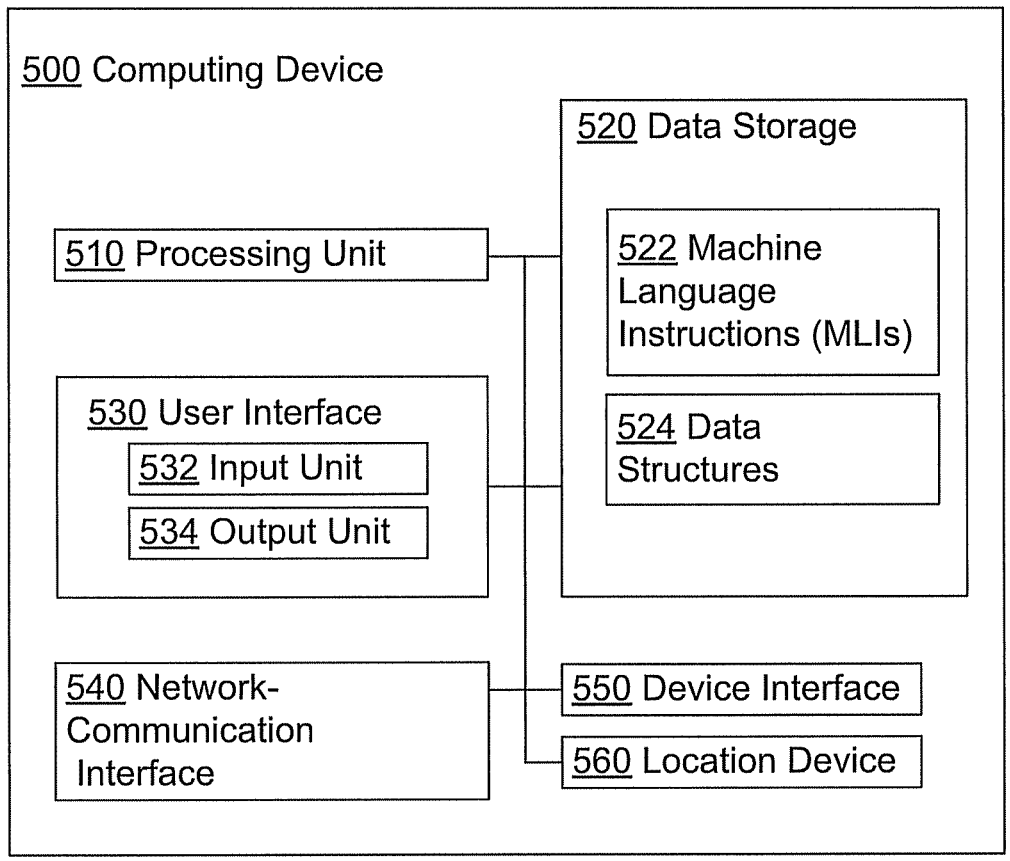
FIG. 5 is a block diagram of an example computing device, in accordance with embodiments of the invention.

FIG. 5 is a block diagram of an example computing device 500, comprising a processing unit 510, data storage 520, a user interface 530, a network-communication interface 540, a device interface 550, and a location device 560, in accordance with embodiments of the invention. A computing device 500 may be a desktop computer, laptop or notebook computer, personal data assistant (PDA), mobile phone, embedded processor, or any similar device that is equipped with a processing unit capable of executing machine-language instructions that implement at least part of the herein-described method 700 of FIG. 7, method 800 of FIG. 8, and/or herein-described functionality of a profile-storage device, a profile-entry device, an on-board display, and/or a vehicle-setting-storage device.

The processing unit 510 may include one or more central processing units, computer processors, mobile processors, digital signal processors (DSPs), microprocessors, computer chips, and similar processing units now known and later developed and may execute machine-language instructions and process data.

The data storage 520 may comprise one or more storage devices. The data storage 520 may include read-only memory (ROM), random access memory (RAM), removable-disk-drive memory, hard-disk memory, magnetic-tape memory, flash memory, and similar storage devices now known and later developed. The data storage 520 comprises at least enough storage capacity to contain machine-language instructions 522 and data structures 524.

The machine-language instructions 522 and the data structures 524 contained in the data storage 520 include instructions executable by the processing unit 510 and any storage required, respectively, to perform some or all of the herein-described functions of a profile-storage device, a profile-entry device, and/or a vehicle-setting-storage device, and/or to perform some or all of the procedures described in method 700 and/or method 800. In particular, the data structures 524 may comprise one or more vehicle-operator profiles, such as the vehicle-operator profile 600 of FIG. 6.

The machine-language instructions 522 also may include instructions executable by the processing unit 510 to perform part or all of the functionality of the convoy planning tool and/or the vehicle deployment planning system described in U.S. patent application Ser. No. 11/955,198.

The user interface 530 may comprise an input unit 532 and/or an output unit 534. The input unit 532 may receive user input from a user of the computing device 500. The input unit 532 may comprise a keyboard, a keypad, a touch screen, a computer mouse, a track ball, a joystick, and/or other similar devices, now known or later developed, capable of receiving user input from a user of the computing device 500.

The output unit 534 may provide output to a user of the computing device 300. The output unit 534 may comprise a visible output device, such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 500. The output unit 534 may alternately or additionally comprise one or more aural output devices, such as a speaker, speaker jack, audio output port, audio output device, earphones, and/or other similar devices, now known or later developed, capable of conveying sound and/or audible information to a user of computing device 500.

The network-communication interface 540 may be configured to send and receive data over a wired-communication interface and/or a wireless-communication interface. The wired-communication interface, if present, may comprise a wire, cable, fiber-optic link or similar physical connection to a data network, such as a wide area network (WAN), a local area network (LAN), one or more public data networks, such as the Internet, one or more private data networks, or any combination of such networks. The wireless-communication interface, if present, may utilize an air interface, such as a ZigBee, Wi-Fi, and/or WiMAX interface to a data network, such as a WAN, a LAN, one or more public data networks (e.g., the Internet), one or more private data networks, or any combination of public and private data networks.

The device interface 550 may communicate with one or more adjustable devices. The one or more adjustable devices may be in a vehicle. The device interface may include a wired-communication device interface and/or a wireless-communication device interface. The wired-communication device interface, if present, may comprise a wire, cable, fiber-optic link or similar physical connection, including the engine data bus depicted in FIG. 3, to the one or more adjustable devices. The wireless-communication device interface, if present, may communicate with the one or more adjustable devices utilizing an air interface, such as a ZigBee interface, a Wi-Fi interface, a WiMAX interface, and/or a radio frequency identification (RFID) interface.

The location device 560 may provide information about a current position of the computing device 500. The location device 560 may be within the same housing as the other components of the computing device 500 or may be a separate device connected to the computing device 560, perhaps using a wired or wireless technology, such as, but not limited to, ZigBee, WiMAX, Wi-Fi, Bluetooth, wires, cables, RS-232, Ethernet, universal serial bus (USB), Personal Computer Memory Card International Association (PCMCIA)/PC Card, Express Card, or similar connection technology. These connection technologies may connect to separate devices acting as components (e.g., a keyboard of the input unit 532) of the computing device 500 as well.

The location device 560 may utilize one or more technologies and techniques to determine the current position, including but not limited to Global Positioning System (GPS), gyroscopes, dead reckoning techniques, magnetic devices such as compasses, landmark comparison processes, lasers (including range finders and ring gyroscopes), and/or radio-frequency waves. Other techniques and technologies for determining the current position of the location device are possible as well. The location device 560 may report the determined current position to the processing unit 510 and/or store the current position in the data storage 520.

An Example Vehicle-Operator Profile

FIG. 6 is a schematic diagram of an example vehicle-operator profile 600, with driver information 610, adjustable-vehicle-related parameters 630, route information 650, communication information 670, and passenger information 690, in accordance with embodiments of the invention.

The driver information 610 may include information about the driver, such as the driver name 612, financial information 614, training/qualification information 616, driver identification information 618, and driver ergonomic data 620. The financial information 614 may include, but not be limited to, information such as account information, credit card, debit card, direct billing, and/or bank account information about the driver. The training/qualification information 616 may include, but not be limited to, information about driver license(s) the driver may have, driver certification and similar information used to determine the driver's ability to operate a given vehicle. The driver identification information 618 may include residence, physical characteristics, address, citizenship, employee number, Social Security Number, driver's license number(s), and/or similar information used to identify the driver.

The driver ergonomic data 620 may include information about physical characteristics of the driver, such as the driver height 622, driver weight 624, driver limb lengths 626, driver health conditions 628, and other ergonomic data 629. The driver height 622 and/or driver weight 624 may be indicated in terms of specific numerical values (e.g., 5'10" or 80 kg.) or in terms of height or weight classifications (e.g., medium build or extra-tall). The limb lengths 626 may include information about arm and/or leg lengths of the driver, either in terms of specific numerical values (e.g., arm length of 50 cm.) or limb-length classifications (e.g., average leg length). The driver health conditions 628 may include information about the health of the driver, such as "sprained ankle". The other ergonomic data 629 may include information about other ergonomic parameters for the driver, such as ease-of-use estimates, the gender of the driver, and/or statistical ergonomic data.

A set of adjustable-vehicle-related parameters 630 may include information about adjustable devices within a vehicle, such make/model information 632 about the vehicle, a seat position 634, mirror positions 636, a steering-wheel position 638, entertainment settings 640, climate-control settings 642, safety settings 644, and other parameters 646. It is to be understood that more than one set of adjustable-vehicle-related parameters 630 may be stored in the vehicle-operator profile. For example, if a soldier typically drives two (or more) vehicles on a regular basis, two (or more) sets of adjustable-vehicle-related parameters 630 may be stored in the vehicle-operator profile 600 for the soldier.

The make/model information 632 may store information about the vehicle, such as but not limited to, the make (e.g., Ford or Toyota) and model (e.g., Taurus or Camry) of the vehicle. The seat position 634, the mirror positions 636, and the steering-wheel position 638 may include information such as, but not limited to, one or more parameters about one or more adjustable seats, mirrors, or the steering wheel, respectively, found in the vehicle.

The entertainment settings 640 may include information about entertainment device(s) in the vehicle. The entertainment devices may include, but are not limited to, radios, MP3 players, DVD players, CD players, and tape players (e.g., cassette and/or 8-track). The entertainment settings 640 may include information about the entertainment devices, including but not limited to, radio frequencies, preset-station information, sound-related settings, download information for audio and/or video data, video-related settings, and stored audio and/or video information. The climate-control settings 642 may include, but are not limited to, one or more parameters that control a climate-control device (e.g., a temperature setting or a fan speed setting). The safety settings 644 may include, but are not limited to, one or more parameters that control safety devices, such as airbag on/off parameters. Other parameters 646 may include parameters for other adjustable devices within the vehicle, such as but not limited to, adjustable rear-view mirrors, speed-control devices, control values for ECUs (e.g., maximum speed values), and heated seats.

The route information 650 may include information about a route of the vehicle, such as a starting location 652, a starting time 654, a destination 654, intermediate points 658, and timing information 660. The staring location 652 may indicate an initial position or source of a route of the vehicle and may be expressed as a street address, map coordinates, context-specific information (e.g., "Checkpoint A"), latitude/ longitude, and/or by use of other information suitable to provide a starting location. The starting location 652 may also have information about the location itself, such as amenities at the location, contact information (e.g., a phone and/or fax number at the starting location) including contact person(s) at the location, opening hours, and the like.

The starting time 654 may indicate a time when the vehicle began traveling along the route and may be expressed as a time of day (e.g., "12:30 PM" or 1345) and/or a date (e.g., Aug. 31, 2008). The destination 656 may indicate a final position of the route of the vehicle and may be expressed using the same types of information used to express a starting location (e.g., as a street address, etc.) and may also have information about the destination itself such as described above for the starting location 654 (e.g., amenities, etc.). The intermediate points 658 may indicate one or more positions along the route, each of which may be expressed using the same types of information used to express a starting location. The intermediate points 658 may also have information about each intermediate point itself such as described above for the starting location 654. The timing information 660 may indicate scheduling information, ending time information, time(s) to arrive at and/or leave from intermediate points, and the like. Each time in the timing information 660 may be categorized (e.g., "scheduled time of arrival at destination") and may be expressed as a time of day and/or a date.

The communication information 670 may include information about contacting the driver of the vehicle, such as an e-mail address 672, connection information 674, a phone number 676, and communication subscription information 678. The e-mail address 672 may include an e-mail address (e.g., address1@honeywell.com) or other electronic contact information (e.g., instant messaging addresses) about the driver of the vehicle. The connection information 674 may include information about a data connection for the vehicle, such as IP address information, connection speed information, and/or lower level addressing information (e.g., MAC or Ethernet address). The phone number 676 may provide one or more phone numbers to contact the driver, which may include phone numbers of the starting location, destination and/or intermediate points.

The subscription information 678 may include information about various communication services used by the driver associated with the vehicle operator profile 600. Example communication services are telephone services (e.g., cell phone information, forwarding number information, and/or telephone customization information, such as ring tones or do-not-disturb indications), entertainment services (e.g., satellite-radio-subscription information), and other in-vehicle communications services. Other communication services are possible as well.

The vehicle-selection information 680 may include a list of favorite vehicles 682 and/or a list of unacceptable vehicles 684. The list of favorite vehicles 682 may indicate one or more vehicles that the driver associated with the vehicle-operator profile 600 prefers to drive. The list of unacceptable vehicles 684 may indicate one or more vehicles that the driver associated with the vehicle-operator profile 600 prefers to not to drive. The one or more vehicles in either list 682 or list 684 may be specified by various types of information, such as, but not limited to, make and model, year, license plate, and/or VIN information. The list of unacceptable vehicles 684 may indicate one or more vehicles that the driver associated with the vehicle-operator profile 600 prefers to not to drive.

The passenger information 690 may include information about one or more passengers in the vehicle, such as but not limited to information similar to the driver information 610 but for the one or more passengers, adjustable-vehicle-related parameters 630 based on adjustments made to adjustable devices by the one or more passengers, and communication information 670 for the one or more passengers.

An Example Method for Adjusting an Adjustable Device

Figure 7:
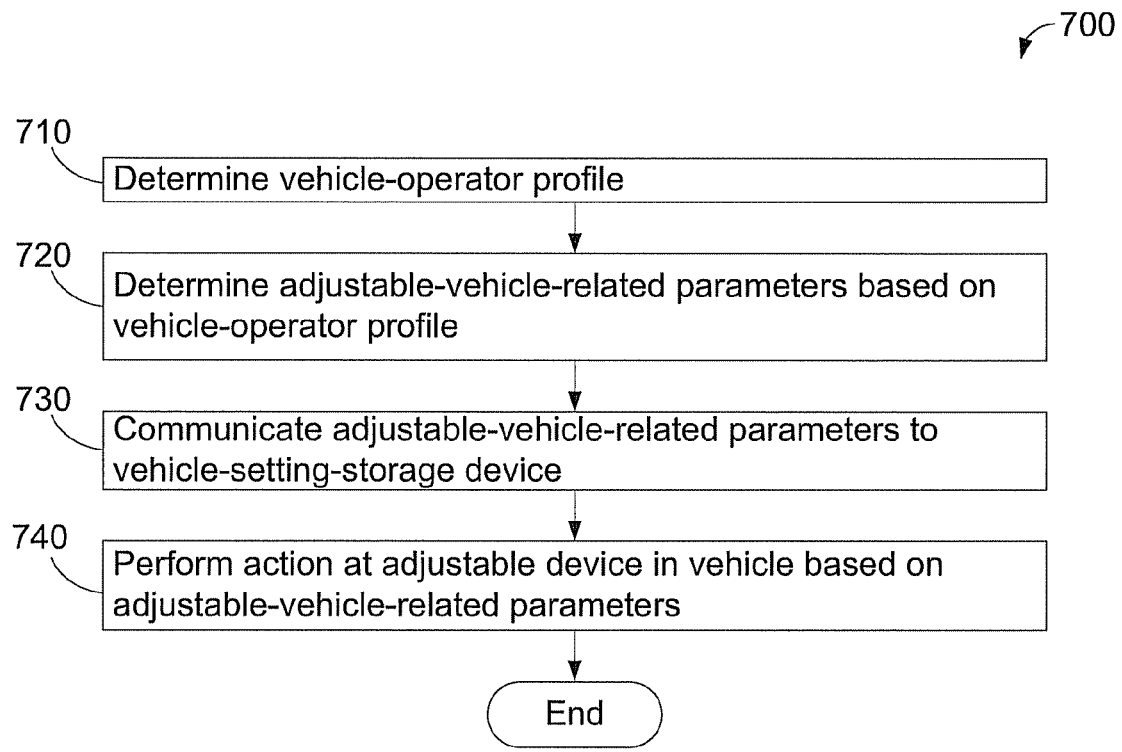
FIG. 7 is a flowchart depicting an example method, in accordance with an embodiment of the invention.

FIG. 7 is a flowchart depicting an example method 700, in accordance with an embodiment of the invention. It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 700 begins at block 710, where a vehicle-operator profile is determined. A vehicle-operator profile may be determined by creating or updating the vehicle-operator profile, perhaps using a profile-entry device and/or a profile-storage device. The created vehicle-operator profile may be associated with a driver, such as by storing a driver's name or other identification as part of the created vehicle-operator profile. The vehicle-operator profile may be created or updated at a first location.

In addition, the vehicle-operator profile may be determined by finding a vehicle-operator profile associated with the driver in a plurality of vehicle-operator profiles. The plurality of vehicle-operator profiles may be stored in a database or similar data structure. The associated vehicle-operator profile may be found by providing a query to the database with information about the driver (e.g., the driver's name or other identification information). The database may use the query to retrieve the associated vehicle-operator profile. The vehicle-operator profile may contain some, all, or more information than shown in the example vehicle-operator profile described above with reference to FIG. 6.

At block 720, a plurality of adjustable-vehicle-related parameters is determined based on the vehicle-operator profile. The plurality of adjustable-vehicle-related parameters may be stored with the vehicle-operator profile, as shown in the example vehicle-operator profile described above with reference to FIG. 6. Adjustable-vehicle-related parameters may be determined by processing information about environmental conditions, such as the temperature or humidity at the location of a vehicle. Also, adjustable-vehicle-related parameters may be determined by processing information stored in the vehicle-operator profile, such as ergonomic data and/or vehicle type information, as well.

At block 730, the plurality of adjustable-vehicle-related parameters is communicated to a vehicle-storage-setting device. Adjustable-vehicle-related parameters may be communicated, perhaps via a data network, to a vehicle-setting-storage device from the profile-entry device and/or the profile-storage device. The data network may be a private data network or a public data network, such as the Internet. The vehicle-setting-storage device may be in or near the vehicle and may be located in a second location that differs from the first location. For example, the profile-entry device may be at a vehicle rental office or motor pool office and the vehicle-setting-storage-device may be in or near a vehicle located in a parking lot, perhaps blocks or even miles away. As such, the plurality of adjustable-vehicle-related parameters may be determined remotely from the vehicle and transmitted to the vehicle-setting-storage device via the data network.

The plurality of adjustable-vehicle-related parameters may be sent along with other information in the vehicle-operator profile, including the entire vehicle-operator profile. The communication may use take place using wired and/or wireless communication technologies. Once received, the vehicle-setting-storage device may store the plurality of adjustable-vehicle-related parameters.

At block 740, an adjustable device in the vehicle performs an action based on the plurality of adjustable-vehicle-related parameters. The vehicle-setting-storage device may send one or more parameters in the plurality of adjustable-vehicle-related parameters to the adjustable device. To send the one or more parameters, the vehicle-setting-storage device may send a request containing the parameters to the adjustable device to perform an action. The action may be to adjust, adapt, or otherwise change the functionality of the adjustable device based on the received parameters. In response to receiving the parameters, the adjustable device may perform the requested action.

An Example Method for Storing a Driver Profile

Figure 8:
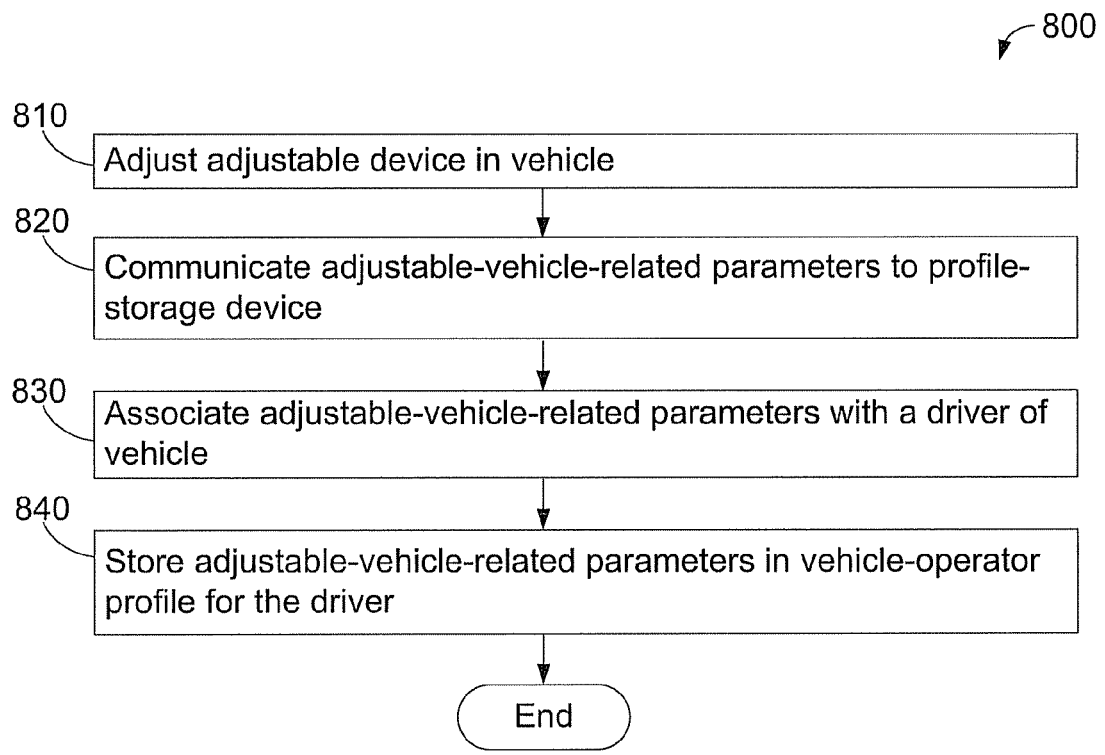
FIG. 8 is a flowchart depicting another example method, in accordance with an embodiment of the invention.

FIG. 8 is a flowchart depicting another example method 800, in accordance with an embodiment of the invention. Method 800 begins at block 810, where an adjustable device in a vehicle is adjusted. The adjustable device may be adjusted in response to an action of a user of the vehicle, such as turning up a volume control of an entertainment device in the vehicle.

At block 820, a plurality of adjustable-vehicle-related parameters is communicated to a profile-storage device. The plurality of adjustable-vehicle-related parameters may be communicated from the vehicle to the profile-storage device via a data network, vehicle-storage-setting device, and/or a profile-entry device. The data network may be a private data network or a public data network, such as the Internet. As such, the profile-storage device may be remotely located from the vehicle.

Each adjustable device in the vehicle may communicate one or more adjustable-vehicle-related parameters: (i) in response to a request from the profile-storage device, (ii) as a notification that the adjustable-vehicle-related parameters have changed, (iii) periodically, such as, but not limited to, on a per-minute or per-hour basis, (iv) by use of a combination of requests, changed parameter notifications and periodic communications, or (v) by use of some other communication strategy. Each adjustable device may communicate parameters based on current settings of the adjustable device. For example, if the volume setting for a radio is changed from 5 to 11, the radio may communicate parameters that the current volume setting is 11.

The plurality of adjustable-vehicle-related parameters may be communicated to a profile-storage device when the vehicle is en route or when the vehicle reaches a destination, such as being returned to a rental agency, fleet administration office, or motor pool. The user may select to communicate some, but not all, adjustable-vehicle-related parameters to the profile-storage device, such as selecting to communicate seat position parameters but not radio station parameters (or vice versa). When a vehicle reaches the destination, the plurality of (selected) adjustable-vehicle-related parameters may be communicated to the profile-storage device either automatically, perhaps as part of a vehicle check-in process, or by action of a person, such as the user.

At block 830, the plurality of adjustable-vehicle-related parameters is associated with a driver of the vehicle. The profile-storage device may associate the plurality of adjustable-vehicle-related parameters with the driver based on information about the driver, such as a name or other identification information about the driver. The plurality of adjustable-vehicle-related parameters may be associated with the driver based on a source of the adjustable-vehicle-related parameters (i.e., the vehicle). This association may be performed by determining a driver related to the source of the adjustable-vehicle-related parameters, such as by searching rental or other vehicle records (perhaps stored in a database and indexed by vehicle so as to support a query of records on a per-vehicle basis) to determine an associated driver of the vehicle. Then, the plurality of adjustable-vehicle-related parameters may be associated with the associated driver.

At block 840, the plurality of adjustable-vehicle-related parameters is stored in a vehicle-operator profile for the driver. The profile-storage device may determine the vehicle-operator profile based on finding a vehicle-operator profile associated with the driver in a database or similar data structure that contains the stored plurality of vehicle-operator profiles. The vehicle-operator profile may be found by querying the database using information about the driver, such as the driver's name or other identification information, and retrieving the associated vehicle-operator profile. The vehicle-operator profile may contain some, all, or more information than shown in the example vehicle-operator profile described above with reference to FIG. 6. Once the vehicle-operator profile for the driver is found, the plurality of adjustable-vehicle-related parameters may then be stored in the found vehicle-operator profile.

Note that methods 700 and 800 may be combined and performed within the spirit of the invention. That is, the procedures of the method 700 first may be performed and then the procedures of method 800 may be performed. Similarly, the procedures of method 800 first may be performed and the procedures of method 700 then may be performed.

CONCLUSION

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

What is claimed is:

1. A device comprising:
   a processor configured to:
   determine a vehicle-operator profile for a driver;
   determine a first plurality of adjustable-vehicle-related parameters for one of a plurality of remote vehicles based on the vehicle-operator profile, and
   transmit a prioritized list of a subset of the plurality of remote vehicles to a display device viewable by the driver, the list being prioritized based on the first plurality of adjustable-vehicle-related parameters; and a network-communication interface, wherein the processor is configured to transmit the first plurality of adjustable-vehicle-related parameters to at least one of the plurality of remote vehicles by at least transmitting the first plurality of adjustable-vehicle-related parameters to the at least one of the plurality of remote vehicles via a data network using the network-communication interface.

2. The device of claim 1, wherein the processor is further configured to receive a second plurality of adjustable-vehicle-related parameters.

3. The device of claim 2, wherein at least one adjustable-vehicle-related parameter in the second plurality of adjustable-vehicle-related parameters is received from an adjustable device of the remote vehicle.

4. The device of claim 2, wherein the processor is configured to receive the second plurality of adjustable-vehicle-related parameters by at least receiving the second plurality of adjustable-vehicle-related parameters via the data network using the network-communication interface.

5. The device of claim 3, wherein the second plurality of adjustable-vehicle-related parameters is determined after adjusting the adjustable device.

6. The device of claim 3, wherein the adjustable device is an entertainment device.

7. The device of claim 3, wherein the adjustable device comprises a power-seat motor.

8. The device of claim 1, wherein the ergonomic data comprises ergonomic data.

9. The device of claim 8, wherein the ergonomic data comprises a height of a driver, a limb length of the driver, or a health condition of the driver.

10. The device of claim 1, wherein the processor is configured to determine the vehicle-determining ergonomic data based on a simulation of a vehicle.

11. A system comprising:
a vehicle from among a plurality of vehicles comprising:
a vehicle-setting-storage device configured to receive a plurality of adjustable-vehicle-related parameters,
a display device viewable by a driver, and
an adjustable device, configured to be adjusted based on at least one of the plurality of adjustable-vehicle-related parameters; and
a profile-storage device remote from the vehicle and configured to:
select a vehicle-operator profile from a plurality of vehicle-operator profiles, wherein each vehicle-operator profile defines at least one adjustable-vehicle-related parameter,
create a prioritized list of the plurality of remote vehicles,
transmit the prioritized list of the plurality of remote vehicles to the display device, the list being prioritized based in part on the at least one adjustable-vehicle related parameter, and
transmit the at least one adjustable-vehicle related parameter from the selected vehicle-operator profile to the vehicle.

12. The device of claim 1, wherein the processor is configured to determine the first plurality of adjustable-vehicle-related parameters by at least determining the first plurality of adjustable-vehicle-related parameters based on environmental conditions.

13. The device of claim 12, wherein the environmental conditions comprise at least one of air temperature or humidity.

14. The device of claim 1, wherein the processor is configured to determine the vehicle-operator profile for the driver by at least receiving driver data from a profile-entry device and determining the vehicle-operator profile for the driver based on the received driver data.

15. The device of claim 14, wherein the driver data is received via a web browser displayed on the profile-entry device and wherein the profile-entry device is configured to transmit the data to the processor via the data network.

* * * * *